United States Patent
Winston et al.

[15] 3,665,389
[45] May 23, 1972

[54] BRAKE CONDITION WARNING SWITCH AND SYSTEM

[72] Inventors: John M. Winston, Birmingham; Walter H. Zimmerman, Rochester, both of Mich.

[73] Assignee: General Motors Corporation, Detroit, Mich.

[22] Filed: Apr. 17, 1970

[21] Appl. No.: 28,240

Related U.S. Application Data

[63] Continuation of Ser. No. 606,945, Jan. 3, 1967, abandoned.

[52] U.S. Cl. ................................340/60, 340/52 B, 340/71
[51] Int. Cl. .........................................B60g 1/44, B60t 17/22
[58] Field of Search ..................200/81.4, 81.5; 340/52, 59, 340/60, 66, 69, 71, 72; 188/1 A, 151 A

[56] References Cited

UNITED STATES PATENTS

| 1,557,330 | 10/1925 | Reynolds | 340/52 UX |
| 2,053,353 | 9/1936 | Talbot | 340/236 UX |
| 2,203,908 | 6/1940 | Hess | 60/54.6 E X |
| 2,332,301 | 10/1943 | Cox | 340/60 UX |
| 2,979,364 | 4/1961 | Putnam | 340/52 C X |
| 3,273,116 | 9/1966 | Quiros et al. | 340/60 |

Primary Examiner—John W. Caldwell
Assistant Examiner—Kenneth N. Leimer
Attorney—W. E. Finken and D. D. McGraw

[57] ABSTRACT

This specification describes a pressure failure indicating device for use with dual hydraulic master cylinders in a vehicle braking system. This system senses a loss of pressure in either of two power chambers to energize a warning lamp in one of the pressures is not up to a predetermined value and also energizes a stop light when pressure in either chamber is up to a predetermined value.

3 Claims, 3 Drawing Figures

Patented May 23, 1972 3,665,389

INVENTORS
John M. Winston &
Walter H. Zimmerman

Donald P. Selnecki
ATTORNEY

BRAKE CONDITION WARNING SWITCH AND SYSTEM

This application is a continuation of application Ser. No. 606,945, filed Jan. 3, 1967, now abandoned.

This invention relates to warning systems and more particularly to a fluid or pressure loss warning system adapted for use with braking systems utilizing a dual master cylinder.

Separate braking systems for use on rear and front wheel brakes of motor vehicles have come into wide usage with the use of a single master cylinder having separate power producing areas for energizing separately the front and rear wheel brakes of a vehicle. This type is generally known as a dual master cylinder. Other systems having a similar function utilize separate master cylinders generally with a single actuator. While these braking systems provide separate braking for front and rear wheels of a vehicle and a vehicle can therefore be stopped while either is functioning, it sometimes is difficult to ascertain whether or not both braking systems are functioning properly. This is due in part to the extremely efficient braking systems found on motor vehicles of recent vintage as well as by the fact that braking may be accomplished under conditions of traffic when the full capability of even a single system is not utilized to stop the vehicle. It therefore becomes desirable to have an indicating mechanism which apprises the vehicle operator of the failure of either braking system when a vehicle is so equipped.

It is an object of the present invention to provide an improved brake pressure and fluid loss warning system for a vehicle having a dual braking system.

It is another object of the present invention to incorporate a stop light operating switch into a braking system equipped as described in the previous object.

It is still another object of the present invention to provide an improved fluid pressure and loss warning system for a dual braking system which is readily adaptable for use with hydraulic master cylinders of different designs.

It is a further object of the present invention to provide an improved fluid pressure and loss warning system for a dual braking system which is readily adaptable to be made integral with a master cylinder.

It is still a further object of the present invention to provide an improved fluid pressure and loss warning system according to the aforementioned object which is simple, reliable, and economical to manufacture.

Further objects and advantages of the present invention will be apparent from the following description, reference being had to the accompanying drawings wherein preferred embodiments of the present invention are clearly shown.

Figure 1:
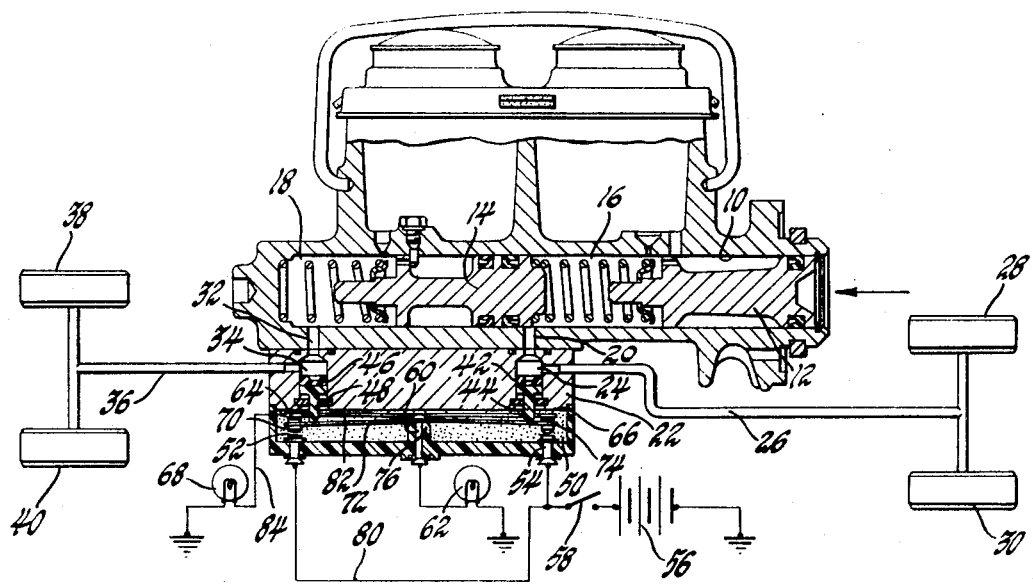
FIG. 1 is a sectional view of one embodiment of the subject invention shown in its operative environment.

Referring to FIG. 1, a dual braking system having a dual master cylinder is illustrated in which a force is provided in bore 10 in the direction of the arrow which results in power piston 12 and power piston 14 moving in bore 10 to the left, as viewed in FIG. 1, resulting in a pressure buildup of fluid in chamber 16 and chamber 18. An outlet 20 from chamber 16 is common to an inlet to switch body 22 and communicates a pressure through chamber 24 and line 26 to brakes carried by wheels 28 and 30 of a vehicle, not shown.

Chamber 18 has an outlet 32 similar to outlet 20 communicating through chamber 34 and line 36 to brakes on vehicle wheels 38 and 40. It is seen that FIG. 1 depicts a dual master cylinder supplying pressure for a dual braking system of well known design.

Enclosing one end of chamber 24 is a piston 42 drivably engaging actuator 44. Chamber 34 is similarly closed by piston 46 and actuator 48.

A switching chamber 50 is formed in switch body 22. Fixed contacts 52 and 54 are formed in a wall of switch body 22 and both are in electrically conductive relationship with a power source or battery 56 through ignition switch 58. Fixed contact 60, also formed in a wall of switch body 22, conductively engages stop light 62. Fixed contacts 64 and 66 are carried by switch body 22 in opposition to contacts 52 and 54 and conductively engage each other through strip 82. In addition, fixed contact 64 is in electrically conductive engagement with pressure warning lamp 68. Movable contact 70 is carried at an end of flexible member 72 and is operatively disposed between fixed contacts 64 and 52. Movable contact 74 is similarly operatively disposed between fixed contacts 66 and 54 and is carried by flexible member 72 at an opposite end from contact 70. Flexible member 72 is mounted on an upraised portion 76 of switch body 22 and conductively engages fixed contact 60.

When the braking system shown in FIG. 1 is in a poised or unpressurized condition, movable contacts 70 and 74 engage fixed contacts 64 and 66 respectively. This is the situation whether or not ignition switch 58 is closed.

When a force is exerted on piston 12 or 14 in the direction of the arrow, pressure buildup normally occurs in chambers 16 and 18 if the braking systems are functioning. This pressure is communicated through outlets 20 and 32 into chambers 24 and 34, respectively. Pressure is simultaneously communicated through lines 26 and 36 to the vehicle brakes as well as being operative against pistons 42 and 46. When pressure exists in both chambers 24 and 34, actuators 44 and 48 drive contacts 74 and 70, respectively, carried by flexible member 72 into engagement with fixed contacts 54 and 52.

Figure 3:
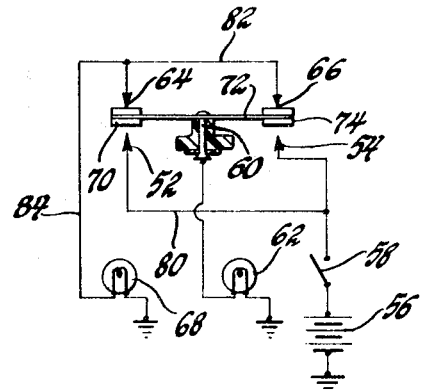
FIG. 3 is a circuit diagram of the indicating system of FIG. 1.

With pressure available in the braking system and sensed in the manner previously set forth, contact 74 engages fixed contact 54 and movable contact 70 engages fixed contact 52. Referring to the circuit diagram of FIG. 3, assuming ignition switch 58 to be closed, a path for current flow exists to stop light 62 but not to warning lamp 68. This is the normal condition of operation when no pressure or fluid loss is being experienced in the braking system described.

Assuming that a pressure loss develops in line 26, for example, no pressure will build up in chamber 16 or in chamber 24 when a force is exerted on power piston 12 and, therefore, piston 42 will not act against resilient member 72 and contact 74 through actuator 44. Therefore, movable contact 74 remains stationary against fixed contact 66. Assuming ignition switch 58 to be closed, a path for current flow exists through lead 80 to fixed contact 52 through movable contact 70, moved into engagement therewith by a pressurized piston 46, through flexible member 72 to contact 60 and stop light 62. In addition, a path for current flow also exists through lead 80, through contact 52 to moved contact 70 and flexible member 72, through contacts 74 and 66, through conductive connector 82 to contact 64 and lead 84 to warning lamp 68. Therefore, under this condition of operation, when pressure does not build up properly in chamber 24, stop light 62 is operative and warning lamp 68, typically situated in the driving compartment of a vehicle, warns a vehicle operator that one of the braking systems has failed and maintenance is necessary. An examination of the circuit diagram of FIG. 3 more clearly sets forth the electrical relationships bringing about the aforementioned result.

If a pressure or fluid loss occurs in chamber 18, chamber 34 or line 36, the same sequence of events occurs as described for a pressure loss in line 26 and its associated system resulting in warning lamp 68 and stop light 62 operating to bring about a warning to a vehicle operator as well as normal functioning of the stop light.

Figure 2:
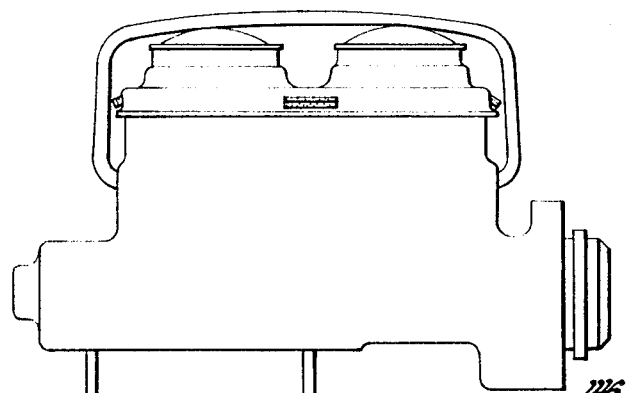
FIG. 2 is a sectional view of another embodiment of the subject invention shown in its operative environment.

Another embodiment of the present invention is illustrated in FIG. 2 wherein a sensing switch is illustrated that can be separate from the hydraulic master cylinder and merely needs to be connected between braking lines of separate braking systems to be operative. Referring to FIG. 2, a switch body 100 has an inlet 102 from a braking line 104 of a first braking system and an inlet 106 from line 108 of a second braking system. The first and second braking systems described herein operate in much the same fashion as the braking system described in the embodiment of FIG. 1. In this embodiment of the subject invention, the stop light circuit is not integral with the operation of the warning system.

Referring to FIG. 2, diaphragm 110 is acted upon by the pressure at inlet 106. Movable strip 112 is carried in a wall of switch body 100 and extends into a first switching chamber 114. An actuator 116 is carried by movable strip 112. Contact 118 is carried by movable strip 112 and normally engages fixed contact 120 but is movable into engagement with a second fixed contact 122 under certain conditions of operation. Spring 124 is contained by insulating block 126 and acts against actuator 116 to keep movable contact 118 in conductive relationship with fixed contact 120.

Similar to the arrangement just described diaphragm 130 is acted upon by the pressure in inlet 102. A movable strip 132 is carried in a wall of switch body 100 and in turn carries the contact 134 in normal engagement with fixed contact 136. Contact 134 is movable into engagement with another fixed contact 138 under certain conditions of operation. Spring 140 acts against actuator 142 carried by movable strip 132 and urges contact 134 toward contact 136. Contact 136 and contact 122 are electrically connected through lead 144, and contacts 138 and 120 are electrically connected by lead 146. Pressure or fluid loss warning lamp 148 conductively engages strip 112 and battery 150 conductively engages strip 132 through ignition switch 152.

Under normal conditions of operation, pressures are built up in lines 104 and 108 resulting in a pressure being transmitted to inlets 102 and 106. Diaphragms 130 and 110 are acted upon simultaneously driving contacts 134 and 118, respectively, into associated contacts 138 and 122. Assuming ignition switch 152 to be closed, it is seen that no conductive path exists to lamp 148 because contacts 118 and 120 are separated.

Assuming a pressure loss in line 108, diaphragm 110 would not move in the aforementioned sequence of operation resulting in contact 118 and 120 remaining engaged. In this case, the conductive path to lamp 148 is complete and lamp 148 lights indicating a loss of pressure or fluid.

A similar result is obtained if a loss of pressure exists in line 104 which results in diaphragm 130 remaining stationary with contacts 134 and 136 remaining engaged. Contact 118, of course, moves into contact 122 completing a path for electrical current to lamp 148 by way of lead 144 and contact 136, still engaged by contact 134 and strip 132. Therefore, a pressure loss in either lines 104 or 108 results in the energization of lamp 148.

It is clear that either embodiment of the subject invention is adapted for use as being integral with a master cylinder as shown in FIG. 1 or as a separate pressure operated switch as shown in FIG. 2. The designer of the particular braking system will determine whether or not the switches would be integral or separate. Both of the subject embodiments find utility as indicators in dual braking systems to apprise a vehicle operator of a failure in either system. The electrical connections are all external to the master cylinders and, therefore, the invention is very easily adapted for use with dual braking systems already mounted on the vehicles as well as being capable of being made integral with dual braking systems when designed as original equipment on vehicles.

While the embodiments of the invention as herein disclosed constitute preferred forms, it is to be understood that other forms might be adopted.

What is claimed is as follows:

1. In a vehicle braking system having first and second vehicle brake actuating circuits and a dual master cylinder including first and second pressurizing chambers for separately pressurizing said first and second vehicle brake actuating circuits, a brake circuit condition indicator comprising:

first and second pressurizing outlets respectively connecting said first and second master cylinder pressurizing chambers to said first and second vehicle brake actuating circuits;

first and second movable pressure responsive members respectively connected with said first and second outlets to receive pressures therefrom;

a switch housing in which said pressure responsive members are mounted; switch means in said switch housing including a first movable contact actuated by said first pressure responsive member, a first pair of fixed contacts, one of which is engaged by said first movable contact when no pressure is received by said first pressure responsive member, and the other of which is engaged by said first movable contact when at least a predetermined minimum pressure is received by said first pressure responsive member, a second movable contact actuated by said second pressure responsive member, a second pair of fixed contacts, one of which is engaged by said second movable contact when no pressure is received by said second pressure responsive member, and the other of which is engaged by said second movable contact when at least a predetermined minimum pressure is received by said second pressure responsive member;

electrical circuitry including said switch means and a source of electrical energy and fluid pressure condition indicating means and electrical lead means selectively interconnecting said fluid pressure condition indicating means and said source of electrical energy through said switch means in accordance with the position of said first movable contact in relation to said first pair of fixed contacts and the position of said second movable contact in relation to said second pair of fixed contacts, said electrical circuitry being open at said switch means when no pressures at or greater than said predetermined minimum pressures are received by said first and second pressure responsive members and when pressures at or greater than said predetermined minimum pressures are received by both of said first and second pressure responsive members, said electrical circuitry being closed at said switch means to energize said fluid pressure condition indicating means when only one of said first and second pressure responsive members receives pressure at or above said predetermined minimum pressure to move only one of said movable contacts out of electrical contact with one of said pair of fixed contacts associated therewith and into electrical contact with the other of said pair of fixed contacts associated therewith, the energization of said fluid pressure condition indicating means informing the vehicle operator of the condition wherein the lack of pressure in one of said vehicle brake actuating circuits exists concurrently with pressure at or above said predetermined minimum pressure in the other of said vehicle brake actuating circuits, second fluid pressure condition indicating means and second electrical lead means connecting the same to said first and second movable contacts, said first-named electrical lead means having a portion thereof electrically connecting said first-named indicating means with said one fixed contacts of said first and second pairs of fixed contacts, and having another portion thereof electrically connecting said source of electrical energy with said other fixed contacts of said first and second pairs of fixed contacts, said second fluid pressure condition indicating means being energized by said source of electrical energy through said switch means and said first-named and said second-named electrical lead means when pressure at or above said predetermined pressure is received by either or both of said first and second pressure responsive members to move either or both of said first and second movable contacts into engagement with the other of said pair of fixed contacts associated therewith, the energization of said second fluid pressure condition indicating means indicating the condition wherein pressure exists at or above said predetermined minimum pressure in at least one of said vehicle brake actuating circuits.

2. In a brake system having a first fluid circuit and a second fluid circuit for actuating brakes connected to said circuits, each of said fluid circuits having a brake system operating condition wherein the fluid circuits are pressurized with brake applying pressure and having a brake released condition in which the circuits are not pressurized,
   a brake system pressurization condition warning system comprising:
   first and second brake system operating condition sensors each including switch means opened and closed in accordance with the operating conditions sensed, said sensors respectively sensing the presence and absence of the first and second brake circuit pressurization conditions,
   first warning means actuated by at least one of said system operating condition sensors through said switch means by the presence of brake actuating pressure in at least one of said fluid circuits and sensed by at least one of said sensors,
   and second warning means actuated through a series connection formed through said switch means of both said first and second sensors, said series connection being established by the presence of the brake system operating condition in one of said circuits and the absence of the brake system operating condition in the other circuit as respectively sensed by said first and second sensors when the brake system is activated to operate the brakes connected to both fluid circuits and one of said fluid circuits is not pressurized.

3. The brake system condition warning system of claim 2, said first and second sensor switch means respectively comprising a first switch and a second switch, each of said first and second switches having:
   first and second and third contacts
   and means biasing said third contact into engagement with said first contact,
   said first and second sensors respectively further including first and second pressure responsive means respectively fluid connected with said first and second fluid pressure actuated brake circuits and actuatable upon pressurization of the associated fluid pressure actuated brake circuit to move said associated third contact from engagement with said associated first contact to engagement with said associated second contact,
   a source of electrical energy and means connecting said second contacts thereto,
   means connecting said third contacts to said first warning means,
   and means connecting said first contacts to said second warning means.

* * * * *